Oct. 16, 1923.
C. C. FARMER
ANGLE COCK DEVICE
Filed Nov. 29, 1919
1,471,115
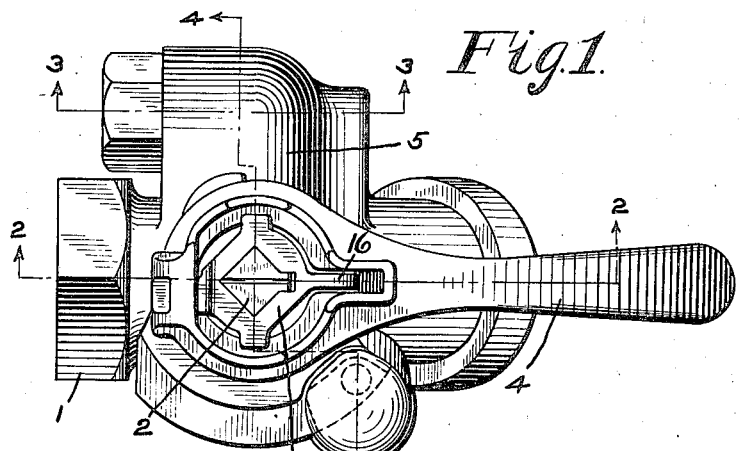
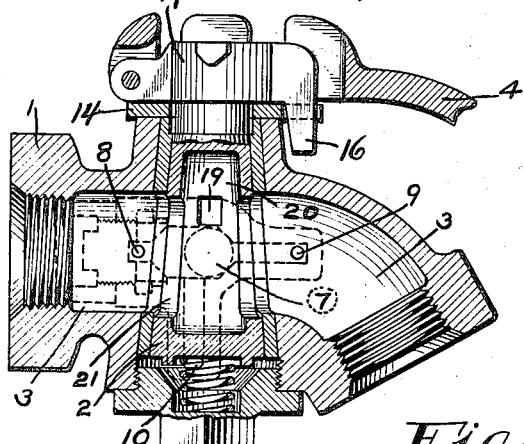
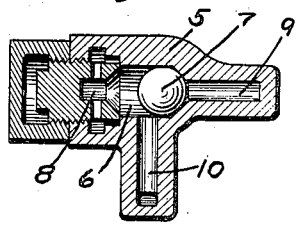
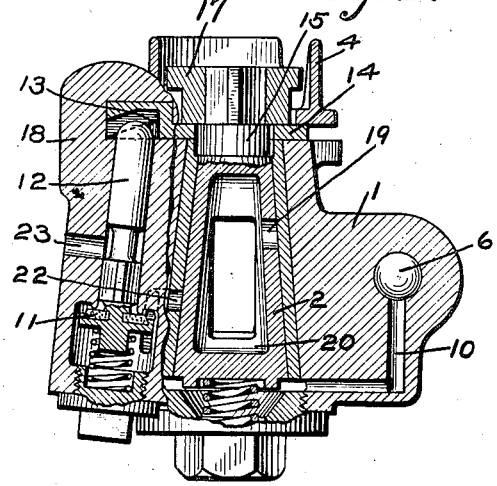
INVENTOR
CLYDE C. FARMER
BY *Wm. M. Cady*
ATTORNEY Patented Oct. 16, 1923.

1,471,115

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ANGLE-COCK DEVICE.

Application filed November 29, 1919. Serial No. 341,448.

*To all whom it may concern:*

Be it known that I, CLYDE C. FARMER, a citizen of the United States, residing at Edgewood, in the county of Allegheny and State of Pennsylvania, have invented new and useful Improvements in Angle-Cock Devices, of which the following is a specification.

This invention relates more particularly to angle cock devices, such as are applied to the train brake pipe on railway vehicles.

The principal object of the my invention is to provide improved means for maintaining the plug valve of an angle cock device seated against pressure tending to unseat the valve.

In the accompanying drawing: Fig. 1 is a plan view of an angle cock device embodying my invention; Fig. 2 a part section on the line 2—2 of Fig. 1; Fig. 3 a section on the line 3—3 of Fig. 1; and Fig. 4 a section on the line 4—4 of Fig. 1.

The angle cock shown in the drawing is of the locking handle type comprising a cock body 1 containing a tapered plug valve 2 for controlling communication through a conduit 3, and adapted to be operated by a handle 4, adapted to be locked in either the open or the closed position of the cock.

In order to provide means for maintaining the valve 2 seated against pressure tending to unseat the valve, the cock body 1 is formed with a portion 5 having a cavity 6 containing a ball check valve 7 adapted to seat in opposite directions.

Passages 8 and 9, communicating with cavity 6 at opposite sides of the valve 7, lead to the conduit 3 at opposite sides of the plug valve 2, and a passage 10, leads from cavity 6 to the space below the plug valve 2.

In the manipulation of the plug valve 2 between its open and closed positions, the fluid pressure in conduit 3 will often be higher at one side than at the other side of the valve 2 and if such is the case the higher pressure will shift the valve 7 to seat against the lower pressure, so that fluid at the higher pressure can then flow past the valve 7 to passage 10 and thence to the space below the plug valve 2.

It will thus be seen, that if the plug valve 2 is in its closed position, the higher pressure on one side or the other of the valve 2 will be present in the space below the valve 2, so that there will always be ample pressure to hold the plug valve to its seat.

In the construction shown, there is also provided a valve for venting fluid from the conduit 3, when the plug valve 2 is turned to its closed position, a similar valve being disclosed in my prior pending application, Serial No. 330,788, filed October 15, 1919.

As shown, a vent valve 11 is provided, having an operating stem 12 which is adapted to be engaged by a cam portion 13, upon turning the cock handle 4 to its closed position. According to the present improvement, the cam portion 13 forms part of a ring 14 which is loosely mounted over the stem section 15 of the plug valve 2.

The ring 14 is provided with a slot in which a downwardly projecting finger 16 of the member 17 engages and since the member 17 is mounted on the squared portion of the plug valve 2 and moves with the plug valve, the ring 14 will also move with said valve.

The cam portion 13 of the ring 14 bears upwardly against a surface formed in the vent valve section 18 of the casting 1.

When the plug valve 2 is turned to its closed postion, fluid is vented from the car side of the conduit 3, through port 19 in the valve 2, cavity 20, port 21, which registers with passage 22, and thence past the valve 11 to exhaust port 23.

By the above construction, since the cam portion 13 is maintained in a fixed relation to the end of the stem 12 by means of the bearing engagement in the portion 18, the wear of the plug valve 2 will not affect the position of the cam portion, so that the lift of the valve 11 will remain constant, when the cock is turned.

Having now described my invention, what I claim as new, and desire to secure by Letters Patent, is:—

1. A cock comprising a body member having a fluid conduit, a plug valve for controlling communication through said conduit, and means subject to the opposing fluid pressures in the conduit at opposite sides of the plug valve and operated by a difference in said pressures for supplying fluid at the higher pressure to one end of the plug valve, to thereby maintain said valve seated.

2. A cock comprising a body member having a fluid conduit, a plug valve for controlling communication through said conduit, and a check valve adapted to seat in opposite directions and subject to the opposing fluid pressures in the conduit at opposite sides of the plug valve for supplying fluid under pressure from said conduit to one end of the plug valve, to thereby maintain said valve seated.

3. A cock comprising a body member having a fluid conduit, a plug valve for controlling communication through said conduit, and means having one position for opening communication from said conduit at one side of the plug valve and another position for opening communication from the conduit at the other side of the plug valve to one end of said plug valve for maintaining said plug valve seated.

4. In an angle cock device, the combination with a body member containing a plug valve for controlling a fluid pressure conduit, of a valve for venting fluid from said conduit in the closed position of the plug valve, a stem for operating the vent valve, a member mounted on and rotatable with said plug valve and having a cam surface for engaging said stem, said member being adapted to engage a bearing surface in the body member for resisting pressure exerted by the valve stem.

In testimony whereof I have hereunto set my hand.

CLYDE C. FARMER.